United States Patent [19]

Ganslmeier et al.

[11] 4,199,986
[45] Apr. 29, 1980

[54] MEDICAL THERMOMETER COMPRISING A DIGITAL DISPLAY DEVICE FOR DISPLAYING THE TEMPERATURE VALUE OF THE BODY TEMPERATURE

[75] Inventors: Michael Ganslmeier, Grafenhaun; Horst Wuenschmann, Munich, both of Fed. Rep. of Germany

[73] Assignee: Siemens Aktiengesellschaft, Berlin & Munich, Fed. Rep. of Germany

[21] Appl. No.: 971,700

[22] Filed: Dec. 21, 1978

[30] Foreign Application Priority Data

Dec. 21, 1977 [DE] Fed. Rep. of Germany ....... 2757124

[51] Int. Cl.² .............................................. G01K 7/16
[52] U.S. Cl. .................................................. 73/362 AR
[58] Field of Search ............. 73/362 AR; 338/22 SD; 324/65 P; 364/557

[56] References Cited

U.S. PATENT DOCUMENTS 3,477,292 11/1969 Thornton ......................... 73/362 AR
4,068,138 1/1978 Miyakawa et al. ............. 73/362 AR

OTHER PUBLICATIONS

Brochure—"Digitales Fiebermessgerat" (Digital Fever Measuring Apparatus) Digimed H 01.

*Primary Examiner*—Donald O. Woodiel
*Attorney, Agent, or Firm*—Hill, Van Santen, Steadman, Chiara & Simpson

[57] ABSTRACT

An apparatus may be connected to the temperature probe by means of a cable, and houses the display device, the electronic circuit, the voltage source, and the switches. The electronic circuit comprises a voltage multiplier, a control circuit, a supply circuit for supplying a highly constant voltage, a bridge circuit comprising four highly constant resistances, and a thermistor as temperature sensor, a voltage divider circuit for adapting the voltage generated by the bridge circuit, and an integrated circuit providing a 3-½ position digital-voltmeter which directly operates the display device.

2 Claims, 2 Drawing Figures

MEDICAL THERMOMETER COMPRISING A DIGITAL DISPLAY DEVICE FOR DISPLAYING THE TEMPERATURE VALUE OF THE BODY TEMPERATURE

BACKGROUND OF THE INVENTION

The invention relates to a thermometer comprising a digital display device for displaying the temperature value of the body temperature, which contains a temperature probe with a thermistor as the electric sensing element, and which contains an apparatus electrically and possibly mechanically connected therewith by means of a cable, in which apparatus the digital display device and an electronic circuit are housed, which consists of an interconnection of integrated circuits, transistors, and passive components, which converts the resistance value of the thermistor—which varies as a function of the temperature of the body—into the digital display, and which is fed by a stabilized voltage source.

The thermometer serves the purpose of measuring the body temperature in the case of human beings and animals.

A medical thermometer of this type is known and has been on the market for a long period of time. In the case of this known thermometer, the resistance value produced by a thermistor constructed as a probe (or sensor), is connected into the feedback branch of an operational amplifier, and the constant voltage connected to the other input of this operational amplifier is thus controlled. By this means, a varyingly great voltage occurs, in dependence upon the temperature of the body, at the output of the operational amplifier. This output voltage of the operational amplifier, in cooperation with additional operational amplifiers and a relatively complicated circuit, is brought to the input of an analog-to-digital converter. In additional integrated circuits, which are constructed in the form of separate modules, respectively, this signal is brought to display in connection with a plurality of transistors which are necessarily present. As the display device, an LED- or an LCD-display can be utilized here. Such display devices are sufficiently known per se.

The necessity of a plurality of separate modules within the circuit, and also the utilization of at least five transistors for the display device, inevitably results in that the known apparatus is not only comparatively large in its external dimensions, but that, in addition, due to the outlay required, this apparatus is utilized for reasons of cost only among experts and even in the latter instance, is utilized only to a limited extent.

SUMMARY OF THE INVENTION

The object underlying the present invention consists in producing a medical thermometer wherein fewer separate modules in the form of integrated circuits and fewer transistors are utilized, so that the apparatus can be constructed smaller in the external dimensions and will become substantially cheaper in cost. The external dimensions are of significance in order e.g. to be able to also carry the apparatus in the pocket of a suit or professional jacket. In addition, it is an object of the invention to make the method of operation of the apparatus more temperature-stable, for which reason possible influences of the ambient temperature are to be eliminated.

In order to solve this problem, the medical thermometer of the type initially cited is characterized in accordance with the invention by virtue of the fact that the electronic circuit is constructed as follows:

(a) a voltage multiplier A, fed by a voltage source, comprising an operational amplifier, feeds an integrated circuit constructed as a module, via a switch off transistor;

(b) this integrated circuit is a complete 3½-position digital-voltmeter, known per se, consisting of an analog-to-digital converter, pulse counter, decoder, display editing (or processing) unit, and circuit elements which determine the operational mode and the measuring range of the integrated circuit;

(c) a control circuit B—serving the purpose of monitoring the voltage source—with an operational amplifier which switches off the transistor in the case of a battery voltage which is too low for the temperature measurement, and thus interrupts the supply voltage for the integrated circuit;

(d) a supply section C with two operational amplifiers generates a highly constant voltage which, via inputs, serves as the reference voltage for the integrated circuit, and also as feed voltage for a bridge circuit D;

(e) the bridge circuit D consists of four highly-constant resistances and the thermistor connected as the temperature sensor;

(f) a network E adapts the voltage generated by the bridge circuit to the reference voltage required for the integrated circuit;

(g) the display device is directly operated by the integrated circuit.

Preferably the four operational amplifiers are housed in one separate module.

Through the invention the following advantages are achieved:

1. Through the utilization of the bridge voltage, resulting from a bridge circuit, for the measuring signal, on the one hand, and for the reference voltage, on the other hand; i.e., the fact that the highly constant voltage is in one instance utilized as the bridge feed voltage and in the other instance as the reference voltage, independence of the apparatus from the ambient temperature is achieved, because, as shall be shown in the following—it is no longer the bridge voltage which is decisive; on the contrary, the ratios of the resistances of the bridge circuit are decisive which, however, on account of the utilization of highly constant metal film resistances, are virtually independent of fluctuations of the ambient temperatures.

2. The decrease in the number of active and passive components, rendered possible by the circuit, leads to a decrease in the dimensions to 65×95×17 mm, and thus to a decrease in the weight of the apparatus, and also to a decrease in the cost. Ambient temperature means here that, in a range of −5° to +50° C. in the case of three different measuring temperatures, only a deviation from the actual value of a maximum of ±0.1° C. is permitted to occur in the display. The temperature of the apparatus in which the electronic circuit is housed is the decisive factor here in terms of the ambient temperature.

The invention shall be explained in greater detail in the following, and other objects, features and advantages will be apparent from this detailed disclosure and from the appended claims.

DETAILED DESCRIPTION

Figure 1:
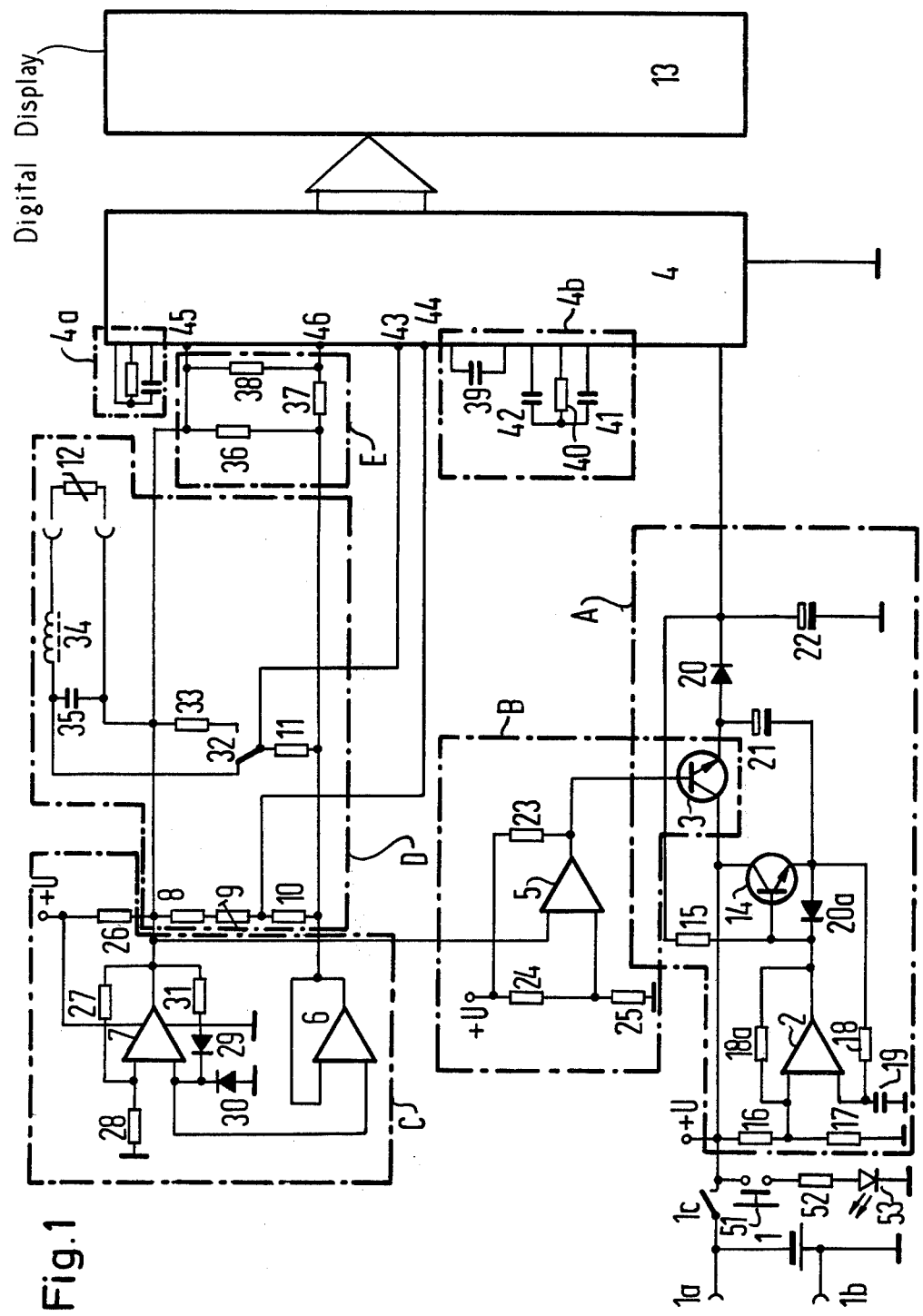
FIG. 1 illustrates a preferred circuit diagram.

In the Figures, the reference signs listed below serve as designations of the individual partial circuits, or components, respectively.

A is a voltage multiplier circuit, consisting of a multivibrator circuit, known per se, (with operational amplifier 2 and transistor 14) with the respective load resistance 15, the voltage divider resistances 16 and 17 and the time element (RC-member 18 and 19), and a transistor 3 which operates only as a rectifier in the voltage multiplier circuit A. In addition, the diodes 20 and 20a and the capacitors 21 and 22 belong to A. Resistance 18a, which functions as a positive feedback, is connected in parallel with operational amplifier 2. Through this resistance 18a, the multivibrator circuit operates in an astable fashion.

As needed (insufficient surrounding brightness), the circuit for supplying voltage +U is connected to ground with push-button key 51 via the resistance 52 and the luminescent diode 53. With the light of the luminescent diode, the display device 13 (LCD-display) is then laterally illuminated such as is e.g. known in the case of clocks with an LCD-display.

B is a control circuit comprising an operational amplifier 5, a load resistance 23, and voltage divider resistances 24 and 25. In the case of control circuit B, transistor 3 functions as a switching transistor which is triggered when there is an insufficient voltage for the temperature measurement.

C is a partial circuit comprising operational amplifiers 6 and 7 to which the load resistance 26, the voltage divider resistances 27 and 28 for the negative feedback, the two Zener diodes 29 and 30, and the series resistance 31 belong.

D is a bridge circuit for which four metal film resistances 8, 9, 10, and 11, with high constancy and the thermistor (or NTC, negative temperature coefficient, resistor) 12, connected as a temperature sensor, are interconnected. Resistance 9 is variable and serves the purpose of balancing the bridge. The thermistor 12 (NTC) is a component, known per se, consisting of oxide material with a negative resistance-temperature-characteristic. Instead of the probe resistance 12, a test resistance 33 for checking purposes can be switched into the circuit with the aid of push-button key 32. This resistance 33 is dimensioned such that, in the case of a functionally correct operating voltage, the value 38.5° C. is indicated on the digital-display device 13, which thus serves as the standardization reading for the indicating the functionally-correct operating mode of the apparatus. In addition, an interference eliminating network is installed which consists of the choke 34 and the capacitor 35. This anti-interference network forms a low-pass filter for eliminating high frequency interferences.

E is a partial circuit which adapts the voltage, generated by bridge circuit D, which voltage is connected to a resistance 36, to the reference circuit necessary for the integrated circuit 4. The partial circuit E, in addition, contains a variable resistance 37, which serves adjustment purposes, and a resistance 38.

4 is an integrated circuit in the form of a separate module which is conventional on the market and e.g. is described in the brochure of the film Intersil, ICL 7106 and ICL 7107—having appeared in German in July 1977. This integrated circuit 4 is a complete 3½-position digital voltmeter which contains in an integrated fashion, an analog-to-digital converter, pulse counter, decoder, and the display editing (or preparation) unit. For the operating mode of this integrated circuit 4, the additional switching elements 4a and 4b are required which determine the operating mode and the measuring range of the integrated circuit 4.

The additional elements 4a consist of a resistance and a capacitor for determining the clock pulse frequency of the internal oscillator. The additional elements 4b consist of a reference capacitor 39, integrating members 40 and 41, and a capacitor 42 for the automatic zero point-correction.

13 is a display device which, in the present instance, can be either an LED-display or an LCD-display.

The voltage source 1 (6 volts) can be a battery or possibly also a chargeable accumulator; for the latter, the charge sockets 1a and 1b are provided. The supply of the circuit with the voltage (+U) is switched on by switch 1c.

The voltage $\Delta U_{ein}$ is supplied to the inputs 43 and 44 of the integrated circuit 4. The voltage $\Delta U_{ref}$ is supplied to the inputs 45 and 46 of the integrated circuit 4. The entire circuit operates as is described in the appended patent claim.

The following statements serve to emphasize the advantages of the present invention.

The equation for a dual-slope-converter is, as is known:

$$\text{Display} = (\Delta U_{ein}/\Delta U_{ref}) \cdot \text{coefficient} \quad (I)$$

The decimal point is determined by the wiring of the display such that in equation (I) the coefficient amounts to 100.

$$\text{Display} = (\Delta U_{ein}/\Delta U_{ref}) \cdot 100 \quad (II)$$

The voltage $\Delta U_{ein}$ is formed by a bridge circuit. This voltage results from the following equation.

$$\Delta U_{ein} = \left( \frac{R(8) + R(9)}{R(8) + R(9) + R(10)} - \frac{R(12)}{R(12) + R(11)} \right) U_{Br} \quad (III)$$

The voltage $U_{ref}$ is formed from the bridge voltage $U_{Br}$ by means of a voltage divider. This voltage results from the following equation.

$$\Delta U_{ref} = \frac{R(38)}{R(38) + R(37)} \cdot U_{Br} \quad (IV)$$

Insertion of equations III and IV into equation II results in the following equation:

$$\text{Display} = \frac{\left( \frac{R(8) + R(9)}{R(8) + R(9) + R(10)} - \frac{R(12)}{R(12) + R(11)} \right) \cdot U_{Br} \cdot 100}{\frac{R(38)}{R(38) + R(37)} \cdot U_{Br}} \quad (V)$$

From the equation (V), it is apparent that the bridge voltage $U_{Br}$ appears in the numerator and in the denominator so that this voltage is cancelled.

The bridge voltage $U_{Br}$ is connected across resistance 36.

By means of the circuit in accordance with the invention, wherein the bridge voltage—as proven—is insignificant as long as it is sufficiently high, it has been made possible for the apparatus to be temperature-independent over an extremely wide temperature range. The required range for temperature-independence lies—as already indicated above—between −5° and +50° C. The circuit according to the invention makes it possible to extend these temperature limits upwardly and downwardly by 15° to 20°, respectively.

Figure 2:
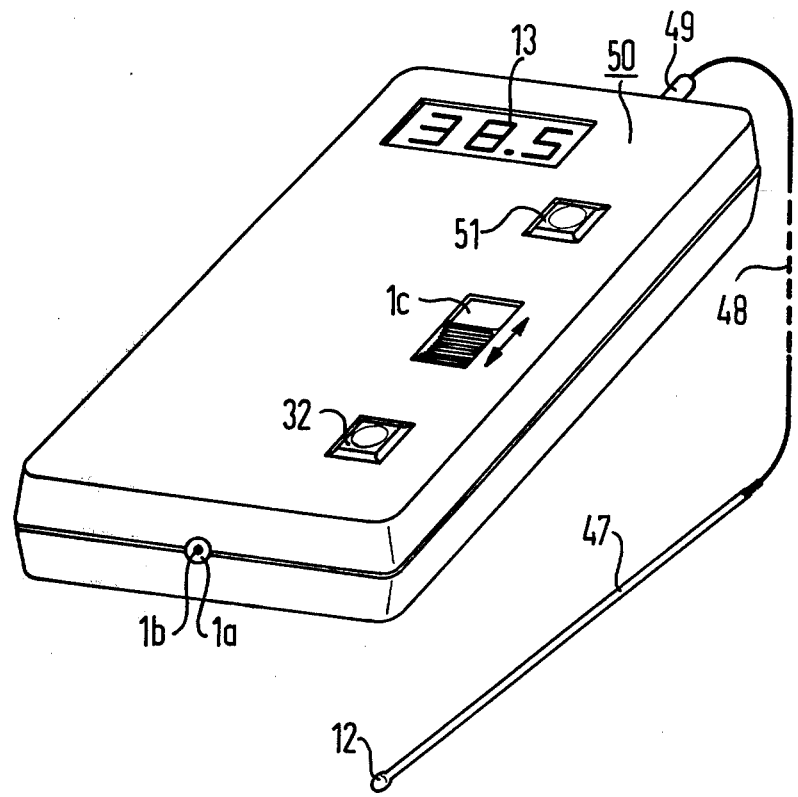
FIG. 2 illustrates the thermometer in a perspective view.

FIG. 2 shows the apparatus together with the sensing element. The thermistor (or NTC resistor) 12 is housed in a rod 47 at the tip of the same. Rod 47 is connected with the apparatus 50 via a cable 48 and a plug 49. Depending upon the intended use, cable 48 can vary in length and also rod 47 can be constructed for the intended use e.g. for the measurement of body temperature (oral or rectal) or also for the measurement of the temperature of restricted parts of the skin surface. It is also possible to make rod 47 very short and very small in the dimensions such that the sensing element with a relatively long cable 48 can also be utilized as a probe which e.g. is introduced into the stomach or into the gallbladder in order that the temperature of these organs can be measured. Finally, the sensing element can be mechanically rigidly connected with the apparatus 50. This has the advantage that, when measuring the temperature of locally restricted areas, the temperature measurement can be conducted with one hand.

Contacts 1a and 1b of the coaxial socket serve the purpose of connecting a charging apparatus. Upon actuating the key switch 32, the comparison value 38.5 appears on the digital display device 13, by means of which the functionally-correct operating mode of the apparatus is indicated. The apparatus is switched on and off with switch 1c. Push-button key 51 serves the purpose of illuminating the display device 13 with a luminescent diode in case the ambient brightness is not sufficiently great in order to permit the liquid crystals contained in the display device 13 to appear.

It will be apparent that many modifications and variations may be effected without departing from the scope of the novel concepts and teachings of the present invention.

We claim as our invention:

1. A thermometer comprising a digital display device for displaying the temperature value of the body temperature, a thermometer probe with a thermistor as the electric sensing element and an apparatus connected electrically therewith, said apparatus having the digital display device and an electronic circuit housed therein, said electronic circuit being operative for converting the resistance value of the thermistor which is a function of the temperature of the body, into the digital display, and a voltage source, characterized in that the electronic circuit comprises the following:

(a) a voltage multiplier (A) fed by the voltage source (1) and comprising an operational amplifier (2) and a cutoff transistor (3) for supplying a supply voltage;

(b) an integrated circuit (4) comprising a complete multidigit-voltmeter comprising an analog-to-digital converter, pulse counter, decoder, display editing and circuit elements (4a and 4b), which determines the method of operation and the measuring range of the integrated circuit (4); said integrated circuit (4) receiving the supply voltage from said voltage multiplier (A);

(c) a control circuit (B) serving the purpose of monitoring the voltage source (1), comprising an operational amplifier (5) controlling said cutoff transistor (3) and responsive in the case of a battery voltage which is too low for the temperature measurement, to switch off the transistor (3) and thus to interrupt the supply voltage for the integrated circuit (4);

(d) a network (C) comprising two operational amplifiers (6, 7) for generating a highly constant voltage, which serves as a reference voltage for the integrated circuit (4) and also as a feed voltage;

(e) a bridge circuit (D) receiving said feed voltage and comprising four highly constant resistances (8, 9, 10 and 11) and the thermistor (12) connected as a temperature sensor;

(f) a network (E) for adapting the voltage generated by the bridge circuit (D) to the reference voltage necessary for the integrated circuit (4); and (g) the display device (13) being directly operated by the integrated circuit (4).

2. A thermometer according to claim 1, characterized in that the operational amplifiers (2, 5, 6 and 7) are contained in a separate module within the apparatus which is operative as a medical temperature measuring instrument.

* * * * *